(12) United States Patent
Muehle et al.

(10) Patent No.: US 10,853,343 B2
(45) Date of Patent: Dec. 1, 2020

(54) RUNTIME DATA PERSISTENCY FOR IN-MEMORY DATABASE SYSTEMS

(71) Applicant: SAP SE, Walldorf (DE)

(72) Inventors: Michael Muehle, Walldorf (DE); Chaitanya Gottipati, Pune (IN); Nirvik Basak, Pune (IN); Mihnea Andrei, Issy les Moulineaux (FR)

(73) Assignee: SAP SE, Walldorf (DE)

( * ) Notice: Subject to any disclaimer, the term of this patent is extended or adjusted under 35 U.S.C. 154(b) by 288 days.

(21) Appl. No.: 15/596,603

(22) Filed: May 16, 2017

(65) Prior Publication Data

US 2018/0336229 A1      Nov. 22, 2018

(51) Int. Cl.
*G06F 16/22*      (2019.01)
*G06F 16/245*      (2019.01)

(52) U.S. Cl.
CPC ........ *G06F 16/2282* (2019.01); *G06F 16/245* (2019.01)

(58) Field of Classification Search
None
See application file for complete search history.

(56) References Cited

U.S. PATENT DOCUMENTS

| | | | | |
|---|---|---|---|---|
| 2,885,659 A | * | 5/1959 | Spielberg | G06F 16/90348 711/111 |
| 2005/0114394 A1 | * | 5/2005 | Kaipa | G06F 16/84 |
| 2008/0195622 A1 | * | 8/2008 | Lelcuk | G06F 16/252 |
| 2012/0124018 A1 | * | 5/2012 | Horii | G06F 9/45504 707/693 |
| 2015/0142819 A1 | * | 5/2015 | Florendo | G06F 16/22 707/741 |

OTHER PUBLICATIONS

LLVM, 2018 LLVM Developers' Meeting: H. Finkel "Heap-to-Stack Conversion" Nov. 28, 2018, Youtube, https://www.youtube.com/watch?v=ITgERgPNTF8.*

* cited by examiner

*Primary Examiner* — Jason G Liao
(74) *Attorney, Agent, or Firm* — Jones Day (57) ABSTRACT

Systems, apparatus, techniques, articles, and methods include a unified table container for storing data and metadata in pages organized in one or more page chains. A determination is made as to whether the query includes a data definition statement. In response to determining that the query includes a data definition statement, in-memory runtime data is persisted to a persistent volume that is configured to be accessed by the database system. The in-memory runtime data includes one or more first data fields and one or more second data fields that are different from the one or more first data fields. Furthermore, the unified table container includes a persistent runtime data descriptor that is associated with the one or more first data fields and persists the first one or more first data fields when persisting the in-memory runtime data.

20 Claims, 7 Drawing Sheets

RUNTIME DATA PERSISTENCY FOR IN-MEMORY DATABASE SYSTEMS

TECHNICAL FIELD

The subject matter described herein relates in general to field of computer database systems. More specifically, the disclosed subject matter relates to persistency of runtime data of an in-memory database system and a persistent storage container for the persisted portion of the runtime data.

BACKGROUND

A database system includes a database and a database management system (DBMS), which allows for the definition, creation, querying, update, and administration of databases. A database is an organized collection of data that is stored in or referenced by database objects. Examples of database objects include tables, indexes, dusters, views, procedures, sequences, synonyms, dictionaries and the like. Tables are the primary and simplest form of data storage in a relational database. Metadata is then used to describe various forms of data that are handled by the database systems. Metadata typically refers to data that provides information about other data, and includes information about database objects used by the database system.

Database systems typically function as database servers to store, retrieve, and analyze data as requested by client applications. Database systems, such as the SAP HANA® database, are required to handle increasingly larger, more complex, and diverse data used by larger numbers of client applications. Thus, many database systems function as in-memory computing platforms performing complex analytics on the data that is primarily stored transiently, i.e., in main memory. Keeping as much data and its metadata as possible in memory optimizes the database system's performance with respect to complex analytics on the data. For example, the metadata of in-memory or persisted tables, also referred to as runtime data, is loaded as an in-memory data structure by the database system.

In the event of a database system crash or rollback, in-memory tables along with the runtime data are unloaded from memory. When the runtime data and any associated in-memory data is unloaded from memory, the runtime data and its data will be lost, unless their latest changes and/or updates were persisted to disk or other persistent storage media or form prior to unloading. As runtime data is frequently updated and changed by execution of data manipulation and data definition statements, persisting runtime data on a continual basis proves inefficient and computationally expansive due to creating a large overhead with respect to compute resources.

SUMMARY

In one aspect, disclosed herein are systems and methods for persisting in-memory runtime data within a database system. Related apparatus, systems, methods, techniques, non-transitory computer-readable storage media and articles are also described. These include receiving a query at a database system that includes a unified table container and determining whether the query includes a data definition statement. In response to determining that the query includes a data definition statement, in-memory runtime data is persisted to a persistent volume that is configured to be accessed by the database system. The in-memory runtime data includes one or more first data fields and one or more second data fields that are different from the one or more first data fields. Furthermore, the unified table container includes a persistent runtime data descriptor that is associated with the one or more first data fields and persists the one or more first data fields when persisting the in-memory runtime data.

In some embodiments, the one or more first data fields include persistent fields of in-memory runtime data and the one or more second data fields include non-persistent fields of in-memory runtime data. In some embodiments, the one or more first data fields do not include non-persistent fields of in-memory runtime data. In some embodiments, the one or more second data fields do not include persistent fields of in-memory runtime data.

In some embodiments, the persisting in-memory runtime data to a persistent volume includes copying each field of the one or more first data fields to a field associated with the persistent runtime data descriptor prior to persisting the one or more first data fields.

In some embodiments, in response to persisting in-memory runtime data to a persistent volume, a redo log or a undo log or both are generated. In some embodiments, the redo log is configured to, upon replaying, generate the one or more first data fields of the in-memory runtime data in memory of the system database following a crash of the database system. In some embodiments, the undo log is configured to, upon replaying, undo changes to the one or more first data fields of the in-memory runtime data in memory of the database following a rollback of the data definition statement.

In some embodiments, the one or more first data fields are loaded from a disk into in-memory of the database system. In some embodiments, the unified table container is loaded for accessing the one or more first data fields loaded in-memory of the database system.

In some embodiments, the one or more first data fields and the one or more second data fields are used to store statistical table information for a table included in the database system. In some embodiments, the runtime statistical table information of a table includes the number of rows in the table, the number of used column ids associated with the table, memory consumption by the table and combinations thereof.

In some embodiments, the query includes a data definition statement, a data manipulation statement, a data control statement or a combination thereof. In some embodiments, the data definition statement includes a data definition language (DDL) command.

In some embodiments, the unified table container includes a persistent column descriptor that includes a bit associated with a column object included in the in-memory runtime data. In some embodiments, the bit included in the persistent column descriptor is set to a value when persisting the in-memory runtime data, the value denoting that the column object associated with the bit is a single valued column object.

In some embodiments, in response to loading a table object into memory, whether the loaded table object includes one or more single valued column objects is determined. In some embodiments, in response to determining that the loaded table object includes one or more single valued column objects, a single value from each of the one or more single valued column objects is extracted. The extracted single value is then stored as a single value field in the in-memory runtime data, which is then associated with the corresponding single valued column object.

Non-transitory computer program products (i.e., physically embodied computer program products) and/or non-transitory computer-readable storage media are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc. Related apparatus, systems, techniques, and articles are also described.

The subject matter described herein provides many technical advantages. Advantages may include reducing the overhead and computational costs that result from persisting runtime data associated with in-memory tables in a database system on a continual basis. In particular, the described methods and systems prove more overhead-efficient and cost-effective for persisting runtime data while ensuring that a consistent version of the runtime data is persisted during the operation of the database system. In addition, the described methods and systems allow for runtime data with variable sized data structure while using a persistency mechanism in form of unified table containers that are based on fixed size metadata. Another advantage includes that the runtime data can be efficiently represented both in a transient state, i.e., loaded into memory, and in a persistent state, i.e., stored or persisted, for example, to a physical storage media or form.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

A database or database system may be represented as a table or a set of tables, the tables containing data in rows and/or columns. In a row based database, data in a table may be stored and organized by rows. Alternatively, data in a table may also be stored and organized by columns and such a database is called a column oriented database or a columnar database. Column oriented databases typically make more efficient use of storage by replacing redundant data with a pointer. One example of a database system is SAP HANA®. SAP HANA® is a column oriented relational database system. SAP HANA® is also an in-memory database (IMDB) in which the data associated with the database is stored in main memory instead of disk storage so it may be accessed more quickly. IMDB systems are generally column oriented databases since column oriented databases make more efficient use of the expensive main memory.

To improve efficiency in accessing and processing data stored in-memory or persisted tables or ether database objects), a database or database system may maintain metadata, also referred to as runtime data, for each table. The runtime data of a table includes statistical information and data about the table, since on-the-fly calculation and/or extraction of statistical properties of the table are computationally costly and inefficient. The database system can use the runtime data to provide monitoring views that allow querying metadata associated with each table for diagnostic purposes. Furthermore, a database system may optimize tables using, for example, a delta merge operation or an optimized compression, to gain maximum performance based on runtime data, such as table size, memory consumption and the like. Table size can also be used to determine the degree of parallelization for table operations like "split" that divides very large tables into two or more table partitions, each of which may, in turn, include two or more fragments and/or other table components.

Runtime data may be table specific and a per-table data structure that includes, for example, information about the memory consumption by various table components or parts, i.e., a main part, a delta part and the like. The main part or delta part of the table can each be divided into one or more fragments. Other examples of runtime data include row counts of various table components or parts, timestamps of table operations, such as create, merge or truncate operations, a cache including a list of single valued columns, and the state of the table, e.g., whether the load status of the table is "delta" or "delta2."

The disclosed subject matter, in some embodiments, the in-memory runtime data includes one or more first data fields and one or more second data fields. The first data fields include persistent runtime data. The second data fields include non-persistent or transient runtime data. The first data fields may include one or more persistent fields of metadata included in the runtime data. The second data fields may include one or more non-persistent fields of metadata included in the runtime data. A data field or field may include a reference name, a data type, one or more data values associated with the data type, or any combination thereof. In some embodiments, the first (persistent) data fields are associated with a persistent storage structure. A persistent storage structure (also referred to as persistent storage container) of the persistent runtime data may include a unified table container.

The present subject matter, in some embodiments, includes using a metadata persistence mechanism in form of a unified table container to persist runtime data. The unified table container stoles data and metadata in pages, which are both organized in one or more page chains. Each page in the page chain can be linked. In some embodiments, the unified table container stores, among other data, table metadata in structures referred to as persistent descriptors. Persistent descriptors are stored in a metadata page chain which is the top level page chain of the unified table container.

The metadata objects included in the loaded pages are materialized into memory each through a transient object handle that pins the underlying persisted page to the memory until the associated table is unloaded. The objects are populated with the data from the underlying persisted pages and each object handle points to a persistent descriptor included in a persisted page of the page chain. In some embodiments, the object handles include one or more transient handles that each point to different instances of a respective transient object or a respective linked object, both included in the unified table container. The metadata objects can include table fragments, table metadata, dictionary objects, columns, column fragments, the page chain, and numerous other types of objects. Modifications to the table metadata can be performed solely in the page chain.

Upon accessing data within the table, a persistence layer of the database system initiates loading the metadata pages associated with the table from disk storage (or other storage media) into a page buffer in memory for transient access. The table metadata is persisted across pages in the page chain. Whenever a persistent descriptor is updated or modified, the pages associated with the persistent descriptor may not immediately be stored or flushed to the disk storage (or other storage media). In some embodiments, these pages are instead marked as "dirty" pages. Dirty pages are then stored or flushed to disk storage asynchronously upon reaching a specified checkpoint, for example, a savepoint or when table is unloaded from memory.

Furthermore, the disclosed subject matter, in some embodiments, includes persisting variable sized runtime data while using a persistency mechanism in form of unified table containers that are based on fixed size metadata. In some embodiments, a table reader identifies single valued columns included in a cache, and then skips reading columns for identified single valued columns, thus optimizing the read process.

Database Systems

Figure 1:
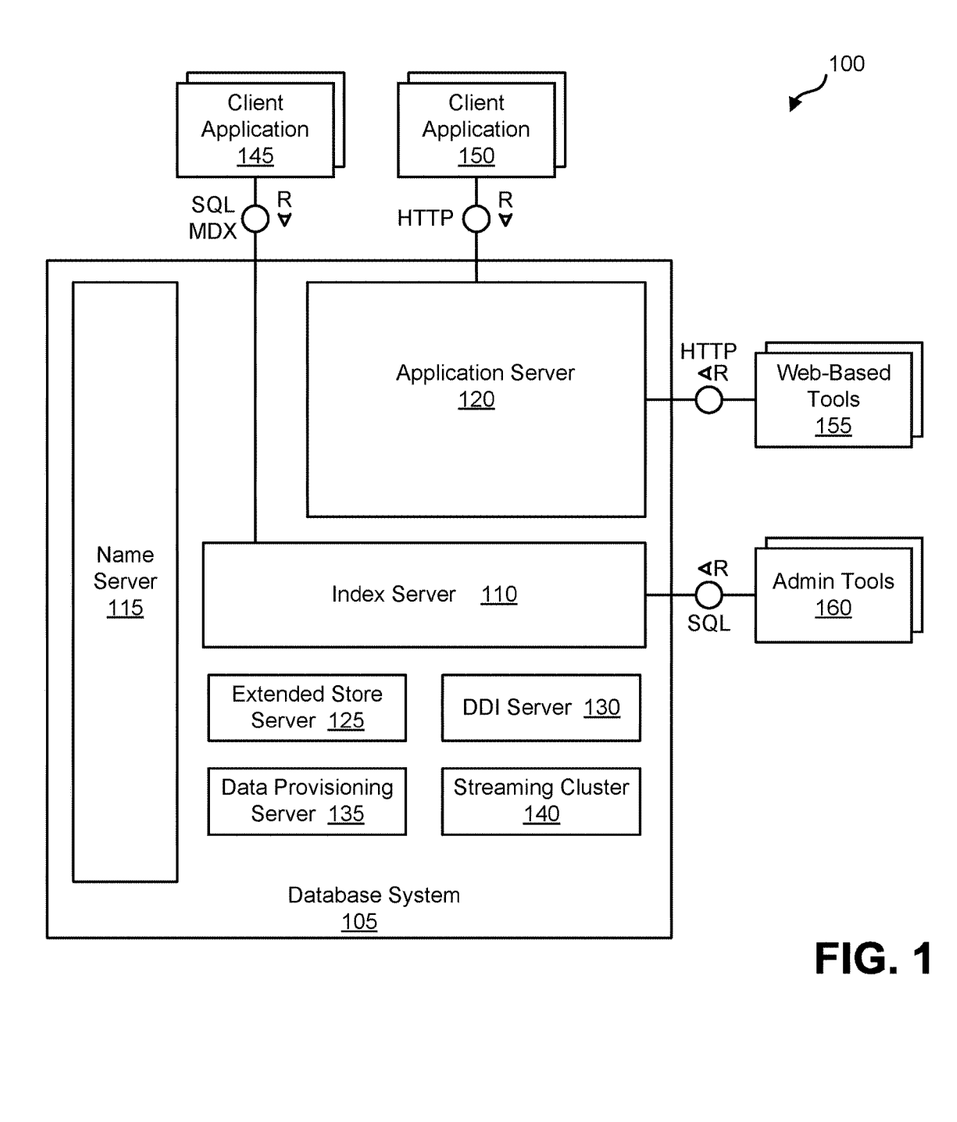
FIG. 1 is a system diagram illustrating an example database system for use in connection with a metadata catalog.

FIG. 1 is a diagram 100 illustrating a database system 105 that can be used to implement aspects of the current subject matter, according to some embodiments. The database system 105 can, for example, be an in-memory database in which all relevant data is kept in main memory so that read operations can be executed without disk 110 and in which disk storage is required to make any changes durables. The database system 105 can include a plurality of servers including, for example, one or more of an index server 110, a name server 115, and/or an application server 120. The database system 105 can also include one or more of an extended store server 125, a database deployment infrastructure (DDI) server 130, a data provisioning server 135, and/or a streaming cluster 140. The database system 105 can be accessed by a plurality of remote clients 145, 150 via different protocols such as SQL/MDX (by way of the index server 110) and/or web-based protocols such as HTTP (by way of the application server 120).

The index server 110 can contain in-memory data stores and engines for processing data. The index server 110 can also be accessed by remote tools (via, for example, SQL queries), that can provide various development environment and administration tools. Additional details regarding an example implementation of the index server 110 is described and illustrated in connection with diagram 300 of FIG. 3.

The name server 115 can own information about the topology of the database system 105. In a distributed database system, the name server 115 can know where various components are running and which data is located on which server. In a database system 105 with multiple database containers, the name server 115 can have information about existing database containers and it can also host the system database. For example, the name server 115 can manage the information about existing tenant databases. Unlike a name server 115 in a single-container system, the name server 115 in a database system 105 having multiple database containers does not store topology information such as the location of tables in a distributed database. In a multi-container database system 105 such database-level topology information can be stored as part of the catalogs of the tenant databases.

The application server 120 can enable native web applications used by one or more remote clients 150 accessing the database system 105 via a web protocol such as HTTP. The application server 120 can allow developers to write and run various database applications without the need to run an additional application server. The application server 120 can also used to run web-based tools 155 for administration, life-cycle management and development. Other administration and development tools 160 can directly access the index server 110 for, example, via SQL and other protocols.

The extended store server 125 can be part of a dynamic tiering option that can include a high-performance disk-based column store for very big data up to the petabyte range and beyond. Less frequently accessed data (for which is it non-optimal to maintain in main memory of the index server 110) can be put into the extended store server 125. The dynamic tiering of the extended store server 125 allows for hosting of very large databases with a reduced cost of ownership as compared to conventional arrangements.

The DDI server 130 can be a separate server process that is part of a database deployment infrastructure (DDI). The DDI can be a layer of the database system 105 that simplifies the deployment of database objects using declarative design time artifacts. DDI can ensure a consistent deployment, for example by guaranteeing that multiple objects are deployed in the right sequence based on dependencies, and by implementing a transactional all-or-nothing deployment.

The data provisioning server 135 can provide enterprise information management and enable capabilities such as data provisioning in real time and batch mode, real-time data transformations, data quality functions, adapters for various types of remote sources, and an adapter SDK for developing additional adapters.

The streaming cluster 140 allows for various types of data streams (i.e., data feeds, etc.) to be utilized by the database system 105. The streaming cluster 140 allows for both consumption of data streams and for complex event processing.

Figure 2:
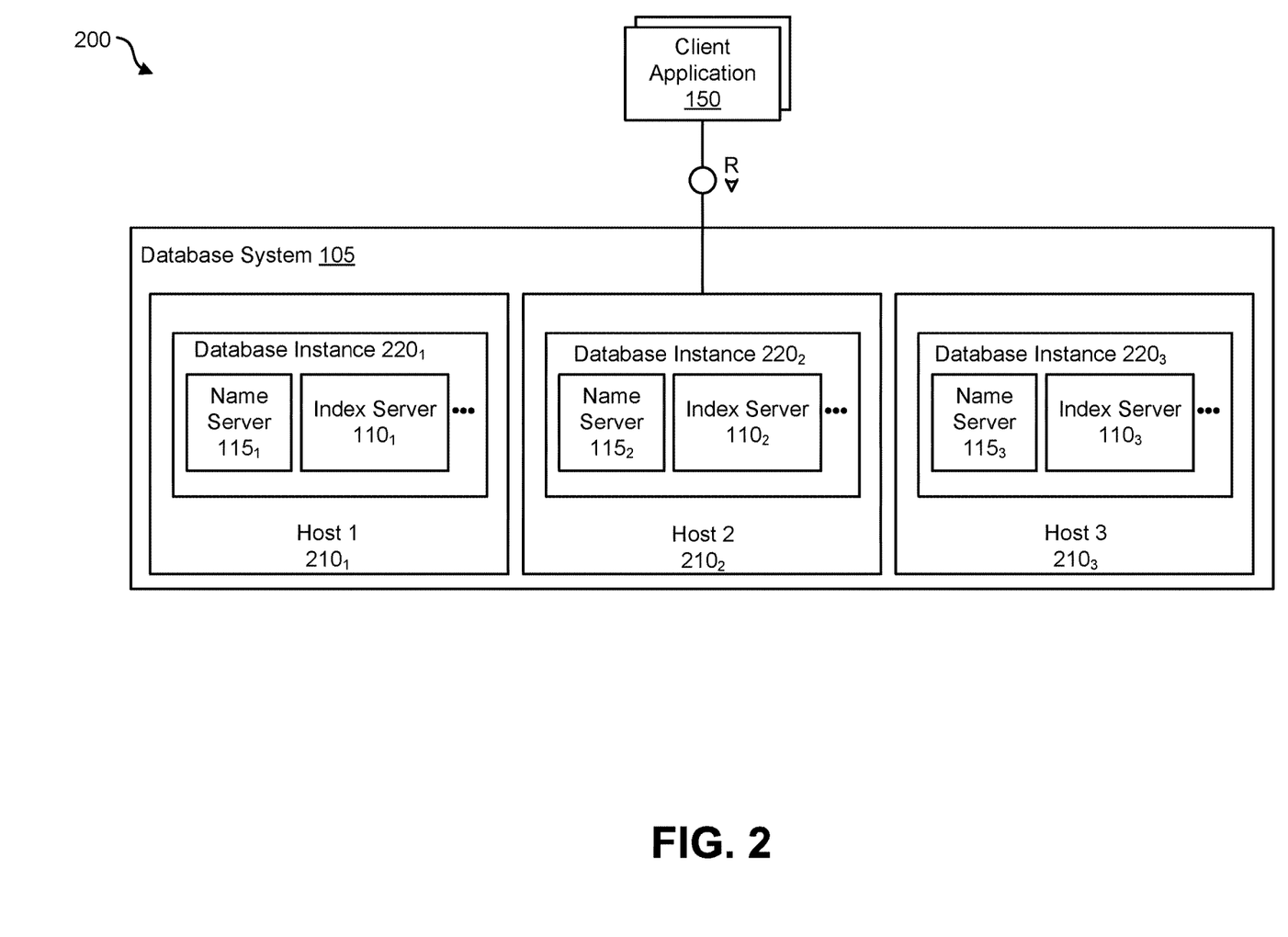
FIG. 2 is a system diagram illustrating a distributed database system having a plurality of database instances for use in connection with a metadata catalog.

FIG. 2 is a diagram 200 illustrating a variation of the database system 105 that can support distribution of server components across multiple hosts for scalability and/or availability purposes, according to some embodiments. This database system 105 can, for example, be identified by a single system ID (SID) and it is perceived as one unit from the perspective of an administrator, who can install, update, start up, shut down, or backup the system as a whole. The different components of the database system 105 can share the same metadata, and requests from client applications 230 can be transparently dispatched to different servers $110_{1-3}$, $120_{1-3}$, in the system, if required.

As is illustrated in FIG. 2, the distributed database system 105 can be installed on more than one host $210_{1-3}$. Each host $210_{1-3}$ is a machine that can comprise at least one data processor (e.g., a CPU, etc.), memory, storage, a network interface, and an operation system and which executes part of the database system 105. Each host $210_{1-3}$ can execute a database instance $220_{1-3}$ which comprises the set of components of the distributed database system 105 that are installed on one host $210_{1-3}$. FIG. 2 shows a distributed system with three hosts, which each run a name server $110_{1-3}$, index server $120_{1-3}$, and so on (other components are omitted to simplify the illustration).

Index Server

Figure 3:
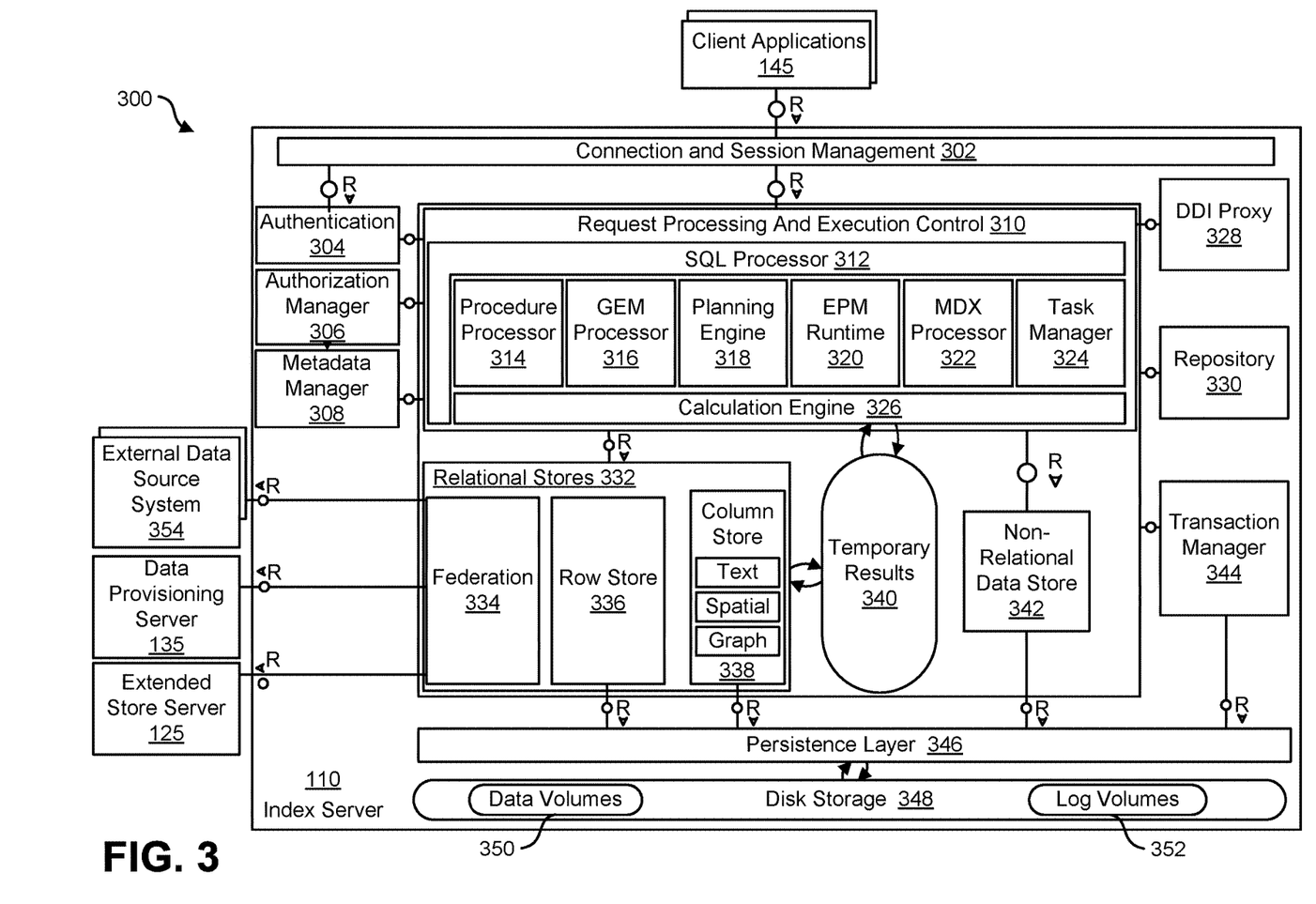
FIG. 3 is a system diagram of an index server forming part of the database system of FIG. 1.

FIG. 3 is a diagram 300 illustrating an architecture for the index server 110 (which can, as indicated above, be one of many instances) forming part of the database system of FIG. 1, according to some embodiments. A connection and session management component 302 can create and manage sessions and connections for the client applications 145. For each session, a set of parameters can be maintained such as, for example, auto commit settings or the current transaction isolation level.

Requests from the client applications 145 can be processed and executed by way of a request processing and execution control component 310. The database system 105 offers rich programming capabilities for running application-specific calculations inside the database system. In addition to SQL, MDX, and WIPE, the database system 105 can provide different programming languages for different use cases. SQLScript can be used to write database procedures and user defined functions that can be used in SQL statements. The L language is an imperative language, which can be used to implement operator logic that can be called by SQLScript procedures and for writing user-defined functions.

Once a session is established, client applications 145 typically use SQL statements to communicate with the index server 110 which can be handled by a SQL processor 312 within the request processing and execution control component 310. Analytical applications can use the multidimensional query language MDX (MultiDimensional expressions) via an MDX processor 322. For graph data, applications can use GEM (Graph Query and Manipulation) via a GEM processor 316, a graph query and manipulation language. SQL statements and MDX queries can be sent over the same connection with the client application 145 using the same network communication protocol. GEM statements can be sent using a built-in SQL system procedure.

The index server 110 can include an authentication component 304 that can be invoked with a new connection with a client application 145 is established. Users can be authenticated either by the database system 105 itself (login with user and password) or authentication can be delegated to an external authentication provider. An authorization manager 306 can be invoked by other components of the database system 145 to check whether the user has the required privileges to execute the requested operations.

Each statement can be processed in the context of a transaction. New sessions can be implicitly assigned to a new transaction. The index server 110 can include a transaction manager 344 that coordinates transactions, controls transactional isolation, and keeps track of running and closed transactions. When a transaction is committed or rolled back, the transaction manager 344 can inform the involved engines about this event so they can execute necessary actions. The transaction manager 344 can provide various types of concurrency control and it can cooperate with a persistence layer 346 to achieve atomic and durable transactions.

Incoming SQL requests from the client applications 145 can be received by the SQL processor 312. Data manipulation or data manipulation language (DML) statements can be executed by the SQL processor 312 itself. Other types of requests can be delegated to the respective components. Data definition or data definition language (DDL) statements can be dispatched to a metadata manager 306, transaction control statements can be forwarded to the transaction manager 344, planning commands can be routed to a planning engine 318, and task related commands can forwarded to a task manager 324 (which can be part of a larger task framework). Incoming MDX requests can be delegated to the MDX processor 322. Procedure calls can be forwarded to the procedure processor 314, which further dispatches the calls, for example to a calculation engine 326, the GEM processor 316, a repository 300, or a DDI proxy 328. In some embodiments, a DDL execution server is part of the metadata manager. DDL is a standard for commands that define different data structures or objects included in a database system. Upon execution of the data definition statements, metadata objects, including, for example, in-memory runtime data, are changed based on the data definition statements.

The index server 110 can also include a planning engine 318 that allows planning applications, for instance for financial planning, to execute basic planning operations in the database layer. One such basic operation is to create a new version of a data set as a copy of an existing one while applying filters and transformations. For example, planning data for a new year can be created as a copy of the data from the previous year. Another example for a planning operation is the disaggregation operation that distributes target values from higher to lower aggregation levels based on a distribution function.

The SQL processor 312 can include an enterprise performance management (EPM) runtime component 320 that can form part of a larger platform providing an infrastructure for developing and running enterprise performance management applications on the database system 105. While the planning engine 318 can provide basic planning operations, the EPM platform provides a foundation for complete planning applications, based on by application-specific planning models managed in the database system 105.

The calculation engine 326 can provide a common infrastructure that implements various features such as SQLScript, MDX, GEM, tasks, and planning operations. The SQLScript processor 312, the MDX processor 322, the planning engine 318, the task manager 324, and the GEM processor 316 can translate the different programming languages, query languages, and models into a common representation that is optimized and executed by the calculation engine 326. The calculation engine 326 can implement those features using temporary results 340 which can be based, in part, on data within the relational stores 332.

Metadata can be accessed via the metadata manager component 308. Metadata, in this context, can comprise a variety of objects, such as definitions of relational tables, columns, views, indexes and procedures. Metadata of all these types can be stored in one common database catalog for all stores. The database catalog can be stored in tables in a row store 336 forming part of a group of relational stores 332. Other aspects of the database system 105 including, for example, support and multi-version concurrency control (MVCC) can also be used for metadata management. In distributed systems and multi-component systems, central metadata can be shared across servers (and tenant databases), and the metadata manager 308 can coordinate or otherwise manage such sharing.

The relational stores 332 form the different data management components of the index server 110 and these relational stores can, for example, store data in main memory. The row store 336, a column store 338, and a federation component 334 are all relational data stores which can provide access to data organized in relational tables. The column store 338 can store relational tables column-wise (i.e., in a column-oriented fashion, etc.). The column store 338 can also comprise text search and analysis capabilities, support for spatial data, and operators and storage for graph-structured data. With regard to graph-structured data, from an application viewpoint, the column store 338 could be viewed as a non-relational and schema-flexible in-memory data store for graph-structured data. However, technically such a graph store is not a separate physical data store. Instead it is built using the column store 338, which can have a dedicated graph API.

The row store 336 can store relational tables row-wise. When a table is created, the creator can specify whether it should be row or column-based. Tables can be migrated between the two storage formats. While certain SQL extensions are only available for one kind of table (such as the "merge" command for column tables), standard SQL can be used on all tables. The index server 110 also provides functionality to combine both kinds of tables in one statement (join, sub query, union).

The federation component 334 can be viewed as a virtual relational data store. The federation component 334 can provide access to remote data in external data source system(s) 354 through virtual tables, which can be used in SQL queries in a fashion similar to normal tables.

The database system 105 can include an integration of a non-relational data store 342 into the index server 110. For example, the non-relational data store 342 can have data represented as networks of C++ objects, which can be persisted to disk. The non-relational data store 342 can be used, for example, for optimization and planning tasks that operate on large networks of data objects, for example in supply chain management. Unlike the row store 336 and the column store 338, the non-relational data store 342 does not use relational tables; rather, objects can be directly stored in containers provided by the persistence layer 346. Fixed size entry containers can be used to store objects of one class. Persistent objects can be loaded via their persistent object IDs or persistent pointers, which can also be used to persist references between objects. In addition, access via in-memory indexes is supported. In that case, the objects need to contain search keys. The in-memory search index is created on first access. The non-relational data store 342 can be integrated with the transaction manager 344 to extend transaction management with sub-transactions, and to also provide a different locking protocol and implementation of multi version concurrency control.

An extended store is another relational store that can be used or otherwise form part of the database system 105. The extended store can, for example, be a disk-based column store optimized for managing very big tables, which ones do not want to keep in memory (as with the relational stores 332). The extended store can run in an extended store server 125 separate from the index server 110. The index server 110 can use the federation component 334 to send SQL statements to the extended store server 125.

The persistence layer 346 is responsible for durability and atomicity of transactions. The persistence layer 346 can ensure that the database system 105 is restored to the most recent committed state after a restart and that transactions are either completely executed or completely undone. Logging is typically used for restoring a database system recovering from a disaster or to communicate transactions, data or metadata between a primary database system and various additional systems. Logging refers to creating and maintaining a log that lists any changes to the state of a database system. For example, logging can be used to prevent loss of persistent data in a database system. Logs can refer to transaction logs and/or metadata logs. A metadata log can include a logical log, a physical log, or a combination of a physical and logical log. In some embodiments, metadata logs are logical logs. In some embodiments, transaction logs are physical logs.

To achieve this goal in an efficient way, the persistence layer 346 can use a combination of write-ahead logs, redo logs, undo logs, shadow paging and savepoints. A savepoint indicates a point within a transaction that can be "rolled back to" without affecting any work done in the transaction before the savepoint was created. Multiple savepoints can exist within a single transaction. All changes made after a savepoint has been declared can be undone by rolling back to the savepoint, i.e., undoing those changes. Write-ahead logs may store both redo and undo information. The persistence layer 346 can provide interfaces for writing and reading persistent data and it can also contain a logger component or log engine that creates and manages transaction logs and/or metadata logs during regular operation of the database system. Transaction log entries can be written explicitly by using a log interface or implicitly when using the virtual file abstraction. The index server 110 can include a log replayer that replays logs to restore the database system to a persistent state.

The persistence layer 236 stores data and logs in persistent disk storage 348 which, in turn, can include data volumes 350 and/or log volumes 352 that can be organized in pages. Different page sizes can be supported, for example, between 4 k and 16M. Data can be loaded from the disk storage 348 and stored to disk page wise. For read and write access, pages can be loaded into a page buffer in memory. The page buffer need not have a minimum or maximum size, rather, all free memory not used for other things can be used for the page buffer. If the memory is needed elsewhere, least recently used pages can be removed from the cache. If a modified page is chosen to be removed, the page first needs to be persisted to disk storage 348. While the pages and the page buffer are managed by the persistence layer 346, the in-memory stores (i.e., the relational stores 332) can access data within loaded pages.

Active operations of applications within the request processing and execution control component 310 may cause a processor to read and write data into main memory or to disk storage 348 from the persistence layer 346. The request processing and execution control component 310 may also cause the processor to generate transaction logs for capturing data transactions upon the database, which the processor then persists in the log volumes 352. As substantially all actively used data may reside in-memory, the request processing and execution control component 310 may interact primarily with data held in main memory while only resorting to data volumes 350 for retrieving and writing less often used data. Additional processes within the request processing and execution control component 310 may be executed by the processor to ensure that in-memory data is persisted in persistence layer 346, so that the data is available upon restart or recovery.

Runtime Data

Runtime Data is data structure inside index server 110. In some embodiments, the runtime data includes in-memory runtime data. Runtime data may be table specific and a per-table data structure that includes, for example, information about the memory consumption by various table components or parts, i.e., a main part, a delta part and the like. The main part or delta part of the table can each be divided into one or more fragments. Other examples of runtime data include row counts of various table components or parts, timestamps of table operations, such as create, merge or truncate operations, a cache including a list of single valued columns, and the state of the table, e.g., whether the load status of the table is "delta" or "delta2."

The runtime data of a table includes statistical information and data about the table. The index server 110 can use the runtime data to provide monitoring views that allow querying metadata associated with each table for diagnostic purposes. Furthermore, the index server 110 may optimize tables using, for example, a delta merge operation or an optimized compression, to gain maximum performance based on runtime data, such as table size, memory consumption and the like. Table size can also be used to determine the degree of parallelization for table operations like "split" that divides very large tables into two or more table partitions, each of which may, in turn, include two or more fragments and/or other table components.

In some embodiments, the runtime data includes one or more first data fields and one or more second data fields. The first data fields include persistent runtime data fields. The second data fields include non-persistent or transient runtime data fields. The second data fields may include one or more non-persistent fields of metadata included in the runtime data. A data field or field may include a reference name, a data type, one or more data values associated with the data type, or any combination thereof. In some embodiments, the runtime data is represented by a persistent storage structure. A persistent storage structure of the runtime data may include a unified table container as further described below. In this embodiment, the persistent storage structure includes fields associated with the first data fields.

Upon receiving a request by a client application, the index server 110 determines whether the request is a data definition statement that updates the in-memory runtime data. In some embodiments, the data definition statement is a DDL command. In response to determining the request includes a data definition statement, the index server 110 persists the first (persistent) data fields of the runtime data to a persistent structure. In some embodiments, in response to determining the request is a data definition statement, the index server 110 persists the second (non-persistent or transient) data fields of the runtime data to a persistent structure. In some embodiments, the index server 110 persists the first data fields by using a persistency mechanism in form of a unified table container. In some embodiments, the persistency mechanism in form of a unified table container includes the index server 110 copying the content of the in-memory runtime data object to the persistent data fields included in the unified table container. In some embodiments, the index server 110 copies fields of the in-memory runtime data object to the corresponding fields in the unified table container when persisting the in-memory runtime data object.

In response to determining the request includes no data definition statement, the index server 110 keeps the in-memory runtime data in memory without persisting it to a persistent structure. In some embodiments, the request includes a data manipulation statement that updates the in-memory runtime data. In some embodiments, the data manipulation statement is a MIL command. In response to determining the request includes a data manipulation statement, the in-memory runtime data object is not persisted.

The first (persistent) data fields are unloaded from memory on a rollback and/or a crash and restart of the index server 110. In some embodiments, the first data fields include the in-memory persistent runtime data fields. In some embodiments, the rollback includes a DDL rollback. In some embodiment, the crash and restart of the index server 110 includes restarting the entire database system. In response to the in-memory runtime data object being unavailable, the index server 110 loads on demand the in-memory data object from the persisted runtime data that has been persisted to, for example, disk storage. In some embodiment, the index server 110 first loads the persisted runtime data into the first (persistent) data fields included in the unified table container and then copies the fields in the unified table container to the corresponding fields of the in-memory runtime data object.

Persistent Storage Container

Figure 4:
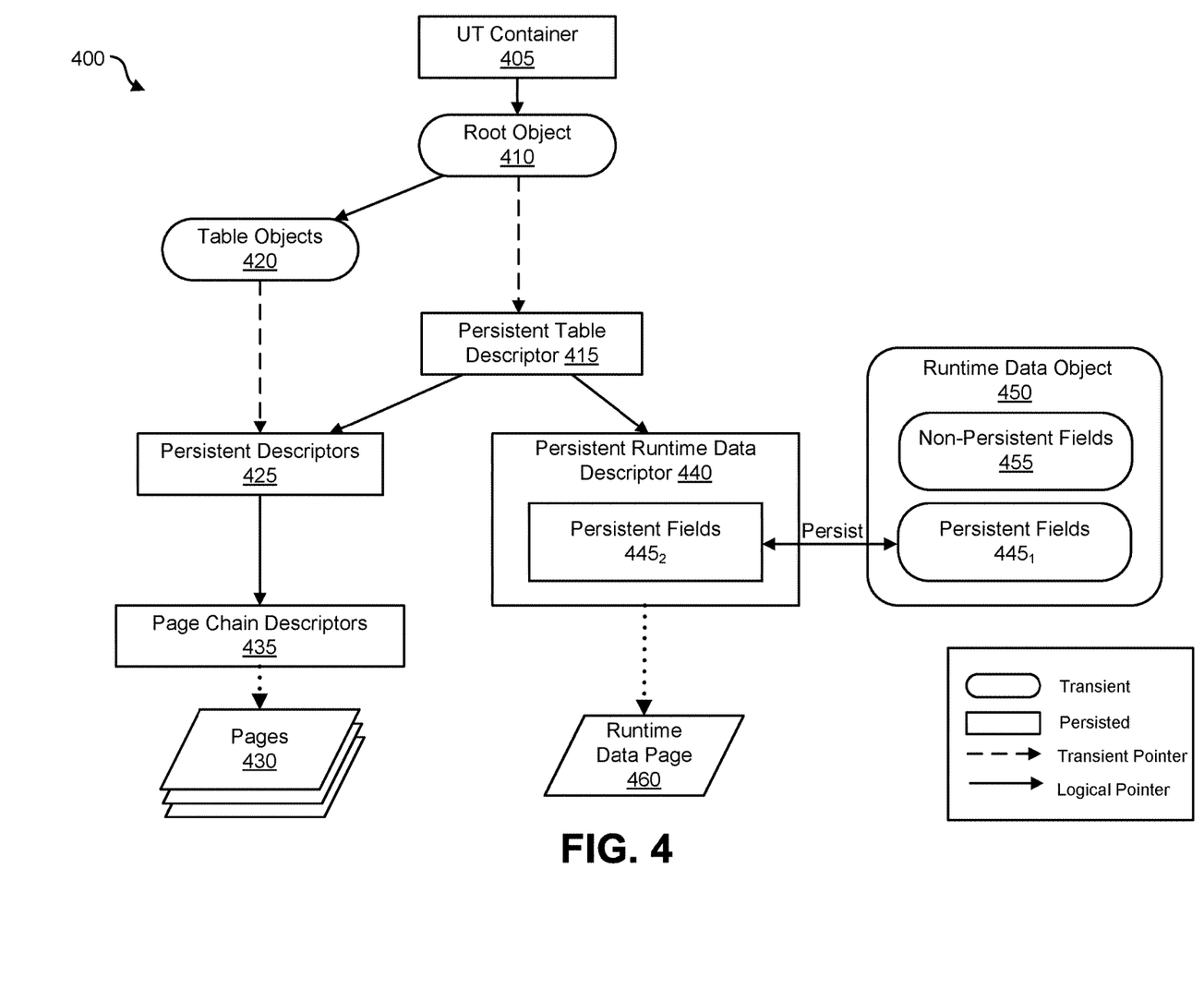
FIG. 4 is a system diagram illustrating a hierarchy of a unified table (UT) container for persisting runtime data.

FIG. 4 is a system diagram 400 illustrating a hierarchy of a unified table (UT) container 405 for persisting runtime data, according to some embodiments. The unified table container 405 may be part of a database system that is: a single instance system, similar to database system 105 depicted in FIG. 1, or may be a distributed variation of database system 105 as depicted in FIG. 2. The unified table container includes a root object 410 of a graph or tree of persistent and transient structures.

It should be appreciated that the hierarchy of the unified table container 405, as illustrated in FIG. 4, is only one example of such hierarchy, and that it optionally has more or fewer objects and descriptors at different levels of the hierarchy than shown, optionally combines two or more objects and descriptors, or optionally has a different configuration or arrangement of the objects and descriptors. The various objects and descriptors shown in FIG. 4 are implemented in hardware, software, or a combination of both, the hardware and software, including one or more signal processing and/or application specific integrated circuits. Persistent descriptors included in the unified table container 405 can provide a persistency mechanism and be used for persisting objects referenced by the persistent descriptors.

The UT container 405 includes the persistent table descriptor 415 which includes the root descriptor of the persistent descriptors of the UT container 405. API entry to the persistent table descriptor 415 is through the root object 410. The root object 410 also includes a pointer to the table object 420, which, in turn, includes a pointer to its persistent descriptors 425. Transient table objects can include table fragments, table metadata, dictionary objects, columns, column fragments, and other types of objects.

The UT container 405 stores data and table metadata in the persistent descriptors that are stored and/or persisted in pages 430. The pages 430 can be organized in one or more page chains and each page in a page chain can be linked to another page in the same page chain. The persistent descriptor 425 further includes a pointer to the corresponding page chain descriptor 435, which pins the underlying persisted pages 430 of the page chain. For example, page chains can include chains of data pages, dictionary pages, and MVCC pages. The persistent descriptors are stored in a metadata page chain which is the top level page chain of the UT container 405.

The table objects included in the loaded pages are materialized into memory each through a transient object handle that pins the underlying persisted page to the memory until the associated table is unloaded. The objects are populated with the data from the underlying persisted pages and each object handle points to a persistent descriptor included in the persisted page of the page chain. In some embodiments, the object handles include one or more transient handles that each point to different instances of a respective transient object or a respective linked object, which are both part of the UT container.

In some embodiments, the persistent table descriptor 415 points to the persistent runtime data descriptor 440. The persistent runtime data descriptor 440 is a per table data structure that is associated with persistent data fields 445 of the runtime data object 450 of a specific table. The persistent runtime data descriptor 440 is used to persist the persistent data fields 445 of the runtime data object 450 in the runtime data page 460. In some embodiments, one or more runtime data descriptors are included in the UT container 405 to persist the persistent data fields of runtime data objects associated with the one or more tables. In addition to persistent data fields 445, the runtime data object 450 may include non-persistent data fields 455. In some embodiments, the persistent data fields $445_2$ of the runtime data object 450 are copied to persistent data fields $445_2$ associated with the persistent runtime data descriptor 440 of the unified table container 405.

Figure 5:
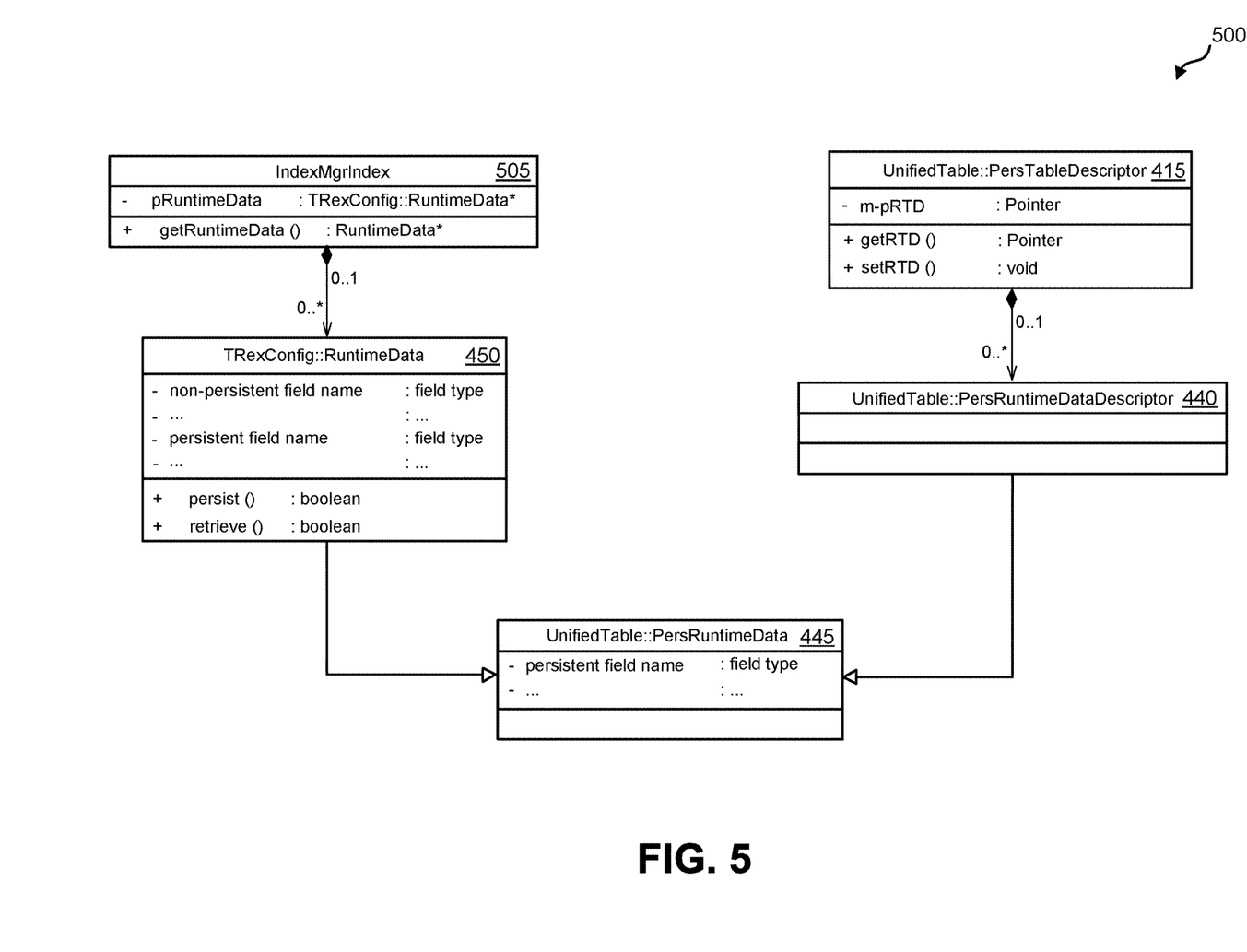
FIG. 5 is a system diagram illustrating an implementation of the persistent runtime data object and the non-persistent runtime data object as part of the database system.

FIG. 5 is a system diagram 500 illustrating an implementation (which can, as indicated above, be one of many instances) of the runtime data object 450 including persistent data fields and the non-persistent data fields as part of the database system of FIGS. 1-3, according to some embodiments. In some embodiments, an index manager 505 of the database system includes a pointer to the runtime data object 450 that includes persistent data fields In addition, the runtime data object includes one or more non-persistent or transient fields of metadata that is part of the runtime data object 450. On the other hand, the persistent table descriptor 415 of the unified table container includes a pointer to the persistent runtime data descriptor 440 that is associated with the persistent data fields 445.

Runtime Data Persistency

Figure 6:
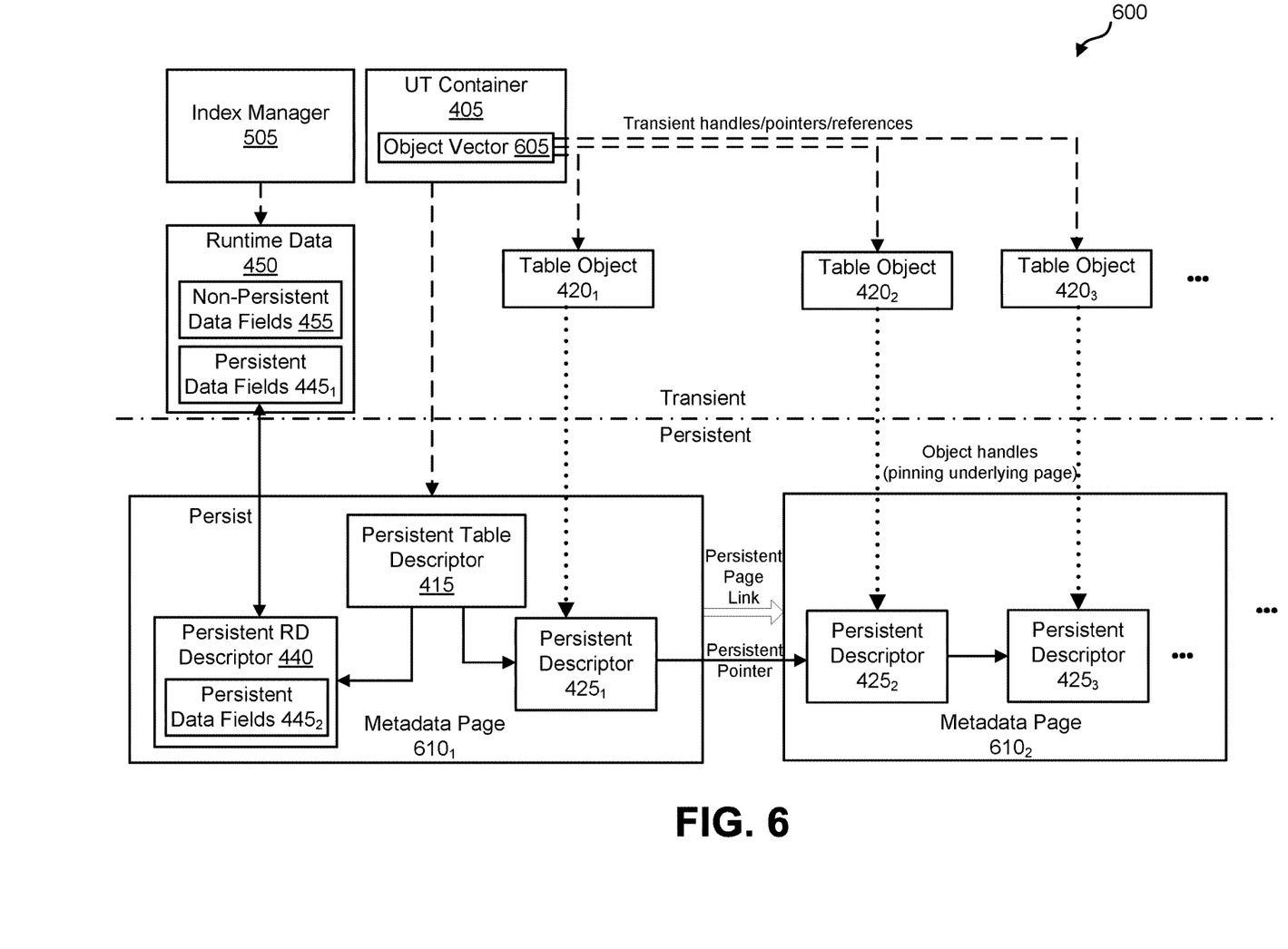
FIG. 6 is a system diagram illustrating the persistency mechanism in form of a UT container to persist runtime data.

FIG. 6 is a system diagram 600 further illustrating the persistency mechanism in form of a UT container 405 to persist run e data, according to some embodiments. The UT container 405 can be loaded into the memory of the database system 105. The UT container 405 can include a vector 605 that is an array of transient handles (e.g., pointers, references, etc.) that can each refer to a different table object $420_{1\ldots3}$. The UT container 405 can also include a transient handle (e.g., pointer, reference, etc.) to a first metadata page $610_1$ that forms part of a metadata page chain $610_{1\ldots2}$ (similar to the page chain described with respect to FIG. 4). The first metadata page $610_1$ can include a persistent table descriptor 415 which is the root of a tree structure of the persistent descriptors included in the UT container 405. The tree of objects describing the structure of the table is stored within the metadata page chain.

Each table object $420_{1-3}$ can include a corresponding object handle to its persistent descriptor $425_{1\ldots3}$, that pins the underlying pages in memory. Pinning can mean that the corresponding memory cannot be swapped out. The object handle points to the persistent descriptor 425 that identifies which portion of the pinned page corresponds to the table object. In some cases, there can be multiple table objects per page. Other objects relating, for example, to, dictionaries, delta table fragments, and main table fragments the delta can also have such a twin transient/persistent representation. In some embodiments, all persistent descriptors 425 have their respective transient object pointing to it via an object handle (and thus pinning them in memory). The persistent descriptors 425 can form a linked chain sequentially linking each descriptor. Each page in the page chain can also be linked.

Upon accessing data within the table object 420 of the UT container 405, a persistence layer of the database system initiates loading the metadata pages 610 associated with the table from disk storage (or other storage media) into a page buffer in memory for transient access. The metadata pages are pinned to the memory until the corresponding table object 420 is unloaded. In some embodiments, the table metadata is persisted across one or more metadata pages 610 in the metadata page chain. Whenever a persisted descriptor 425 is updated or modified, the pages associated with the persisted descriptor may not immediately be stored or flushed to the disk storage (or other storage media). In some embodiments, these pages are instead marked as "dirty" pages. Dirty pages are then stored or flushed to disk storage asynchronously upon reaching a specified checkpoint, for example, a savepoint or when table object 420 is unloaded from memory.

This metadata persistency mechanism of the UT container 405 can be used for persisting the runtime data object 450. In some embodiments, the runtime data 450 includes one or more persistent data fields 445 and non-persistent or transient data fields 455. The persistent table descriptor 415 of the UT container 405 also includes a pointer to a persistent runtime data descriptor 440 to persist the one or more persistent data fields 445 of the runtime data object 450. To persist the non-persistent or transient data fields 455, their content is copied to the persistent data fields 445 associated with the persistent runtime data descriptor 440. To retrieve persisted runtime data, the contents of the persistent data fields 445 associated with the persistent runtime data descriptor 440 is copied to the corresponding fields of the runtime data object 450. In some embodiments, the UT container is loaded into memory for accessing the persistent data fields 445 through the persistent runtime data descriptor 440.

In some embodiments, the persistent data fields 445 associated with persistent runtime data descriptor 440 are automatically stored or flushed to disk storage (or other storage media) only during savepoint and when the table is unloaded. In addition, the runtime data is persisted through the persistent runtime data descriptor 440 in response to receiving a request that includes a data definition statement that updates or changes the runtime data.

In some embodiments, persisting the runtime data also includes logging updates and changes to runtime data between times at which the runtime data is persisted. Logging avoids loss of such updates or changes and ensures runtime data consistency during operation of the database system. In some embodiments, changes and updates to the runtime data fields are logged using redo logs, undo logs, or combinations of logs. The logs can include transaction logs and metadata logs in the form of logical, physical, or any similar log type. For example, after a crash of the database system, a redo log is used to reconstruct the persistent runtime data object. In the case of a DDL rollback, an undo log is used to undo changes and/or updates to the persistent runtime data.

In some embodiments, the runtime data is persisted upon every DDL command, since the runtime data is unloaded from memory in the event of a DDL rollback. This guarantees that upon reloading the runtime data after a DDL rollback, the database system is in a consistent version with respect to any DDL updates or changes to the runtime data.

In some cases, once a DDL command has persisted the runtime data, the DDL command may need to be rolled back. In this case, the persisted runtime data is brought back to its state prior to execution of the DDL command. In some embodiment, the runtime data is rolled back by replaying the undo log associated with the DDL command. Upon replaying the undo log, the persistent runtime data object is returned to its state prior execution of the DDL command by rewriting that state to the persistent runtime data descriptor.

In some embodiments, portions of the runtime data is easily reconstructed upon loading the runtime data into memory, eliminating the amount of runtime data that needs to be persisted. For example, DML's update to the runtime data, such as changes to the number of rows in a table, are not persisted according to the above described persistency, and thus, may be lost in event of a crash or restart of the database system. In this case, updates and changes based on execution of DML commands are recorded in a redo log. Upon loading a table into memory, changes to the runtime data are recalculated based on the redo log and the runtime data is modified accordingly. This guarantees that even after a crash, the database system includes a consistent state of the runtime data.

Single Value Cache

In some embodiments, a single value cache is used to represent single value table columns within a table or table object. The single value cache is included in the non-persistent or transient runtime data object. A single value cache can be represented by a list of tuples T(a,b) where "a" is column id of a single valued column and "b" is the single value included in the single value column associated with the column id. Since a table or table object may contain variable number of single valued columns, the size of single value cache, i.e., the number of tuples, may vary. In some embodiments, the persistency mechanism described above is stored using a fixed size data structures. In this case, the single value cache is not persisted via the persistent runtime data descriptor. Instead, a persistent column descriptor of the unified table container is used to persist the single value cache. In some embodiments, the unified table container includes one or more persistent column descriptor for each column in the table.

A bit included the persistent column descriptor is then set to a value of "1" to denote that the column or column object associated with the bit is single valued. In some embodiments, the bit included in persistent column descriptor is set when persisting the in-memory runtime. During loading of the table into memory, the column descriptors are evaluated to identify the single valued columns in the table. In response to determining that the column data of a column or column object is single valued, the single value is extracted from the column data and stored as a single value field in the runtime data that is associated with the column of the table.

Figure 7:
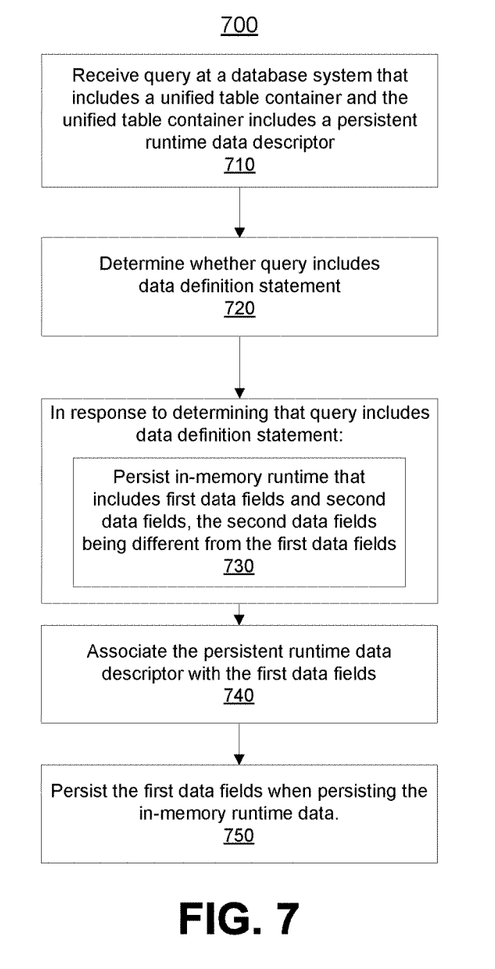
FIG. 7 is a process flow diagram illustrating a method of persisting runtime data of an in-memory database system.

FIG. 7 is a process flow diagram 700 illustrating a method of persisting runtime data of an in-memory database system, according to some embodiments. In some embodiments, a query is received 710 at the database system. The database system includes a unified table container. The method includes determining 720 whether the query includes a data definition statement. In response to determining that the query includes a data definition statement, in-memory runtime data is persisted 730 to a persistent volume that is configured to be accessed by the database system. The in-memory runtime data includes one or more first data fields and one or more second data fields that are different from the one or more first data fields. Furthermore, the unified table container includes a persistent runtime data descriptor that is associated 740 with the one or more first data fields and persists 750 the one or more first data fields when persisting the in-memory runtime data.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) and/or a touchscreen by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method for in-memory persistent runtime data within a database system, the method comprising:
    receiving a query by at least one data processor of a database system, the database system including a table container, the table container storing data and metadata in pages organized in one or more page chains;
    determining, by the at least one data processor, whether the query includes a data definition statement that updates or changes in-memory runtime data;
    in response to the determining that the query includes a data definition statement, copying, by the at least one data processor, the in-memory runtime data to a persistent volume, the persistent volume being configured to be accessed by the database system;
wherein:
    the in-memory runtime data includes one or more first data fields comprising persistent data fields and one or more second data fields comprising non-persistent data fields, the one or more first data fields being different from the one or more second data fields; and
    the table container includes a persistent runtime data descriptor that is associated with the persistent data fields and persists the one or more second data fields by copying each field of the non-persistent data fields to a field associated with the persistent runtime data descriptor.

2. The method of claim 1, wherein the persisting in-memory runtime data to a persistent volume includes the copying of each field of the one or more first data fields to the field associated with the persistent runtime data descriptor prior to copying the one or more second data fields into the database system.

3. The method of claim 1, further comprising in response to the copying, generating a redo log or a undo log or both.

4. The method of claim 3, wherein the redo log is configured to, upon replaying, generate the one or more first data fields of the in-memory runtime data in memory of the system database following a crash of the database system.

5. The method of claim 3, wherein the undo log is configured to, upon replaying, undo changes to the one or more first data fields of the in-memory runtime data in memory of the database following a rollback of the data definition statement.

6. The method of claim 1, further comprising loading the one or more first data fields from a disk into in-memory of the database system.

7. The method of claim 1, further comprising loading the table container for accessing the one or more first data fields loaded in-memory of the database system.

8. The method of claim 1, wherein the one or more first data fields and the one or more second data fields are used to store statistical table information for a table included in the database system.

9. The method of claim 8, wherein the runtime statistical table information of a table includes the number of rows in the table, the number of used column ids associated with the table, memory consumption by the table and combinations thereof.

10. The method of claim 1, wherein the query includes a data definition statement, a data manipulation statement, a data control statement, or a combination thereof.

11. The method of claim 10, wherein the data definition statement includes a data definition language (DDL) command.

12. The method of claim 1, wherein the table container includes a persistent column descriptor that includes a bit associated with a column object included in the in-memory runtime data.

13. The method of claim 12, wherein the bit included in the persistent column descriptor is set to a value when copying the in-memory runtime data, the value denoting that the column object associated with the bit is a single valued column object.

14. The method of claim 1, further comprising in response to loading a table object into memory, determining whether the loaded table object includes one or more single valued column objects.

15. The method of claim 14, further comprising in response to determining that the loaded table object includes one or more single valued column objects, extracting a single value from each of the one or more single valued column objects;
    storing the extracted single value as a single value field in the in-memory runtime data; and
    associating the single value field with the corresponding single valued column object.

16. A computer-implemented system for in-memory persistent runtime data within a database system, the computer-implemented system comprising:
    one or more data processors; and
    memory storing instructions which, when executed by the one or more data processors, result in operations comprising:
        receiving a query by at least one data processor of a database system, the database system including a table container, the table container storing data and metadata in pages organized in one or more page chains;

determining whether the query includes a data definition statement that updates or changes in-memory runtime data;

in response to the determining that the query includes a data definition statement, copying the in-memory runtime data to a persistent volume, the persistent volume being configured to be accessed by the database system;

wherein:
the in-memory runtime data includes one or more first data fields comprising persistent data fields and one or more second data fields comprising non-persistent data fields, the one or more first data fields being different from the one or more second data fields; and the table container includes a first persistent runtime data descriptor that is associated with the persistent data fields and persists the one or more second data fields by copying each field of the non-persistent data fields to a field associated with the persistent runtime data descriptor.

17. A non-transitory computer program product for in-memory persistent runtime data within a database system, the non-transitory computer program product storing instructions which, when executed by one or more data processors of one or more computing devices, cause at least one data processor to perform operations comprising:

receiving a query by at least one data processor of a database system, the database system including a table container, the table container storing data and metadata in pages organized in one or more page chains;

determining whether the query includes a data definition statement that updates or changes in-memory runtime data;

in response to the determining that the query includes a data definition statement, copying the in-memory runtime data to a persistent volume, the persistent volume being configured to be accessed by the database system;

wherein:
the in-memory runtime data includes one or more first data fields comprising persistent data fields and one or more second data fields comprising non-persistent data fields, the one or more first data fields being different from the one or more second data fields;

the table container includes a persistent runtime data descriptor that is associated with the persistent data fields and persists the one or more second data fields by copying each field of the non-persistent data fields to a field associated with the persistent runtime data descriptor; and the query is defined in at least one of a multidimensional query language, a graph query and manipulation language, or a structure query language.

18. The computer-implemented system of claim 16, wherein the table container further comprises a pointer to the persistent runtime data descriptor.

19. The computer-implemented system of claim 16, wherein (i) the table container comprises a second persistent runtime data descriptor and (ii) the first persistent runtime data descriptor and the second persistent runtime data descriptor form a linked chain sequentially linking each descriptor.

20. The method of claim 15, further comprising:
identifying, after the associating, the single valued column object having the single value field; and
skipping reading of the identified single valued column object having the single value field.

* * * * *